July 7, 1953     R. B. BOURNE     2,644,542
SILENCER WITH PLURAL EXPANSION
CHAMBERS AND OUTLET CONDUITS
Filed June 23, 1951

Roland B. Bourne
*Inventor* by Edward C. Taylor
*Attorney*

Patented July 7, 1953

UNITED STATES PATENT OFFICE 2,644,542

2,644,542

SILENCER WITH PLURAL EXPANSION CHAMBERS AND OUTLET CONDUITS

Roland B. Bourne, West Hartford, Conn., assignor to The Maxim Silencer Company, Hartford, Conn., a corporation of Connecticut Application June 23, 1951, Serial No. 233,199

2 Claims. (Cl. 181—57)

This invention relates to silencers particularly adapted for installation within a vehicle such as a military tank, but capable of use on other types of installation. It has especial utility in cases where space is scanty. It is desirable to locate a tank silencer within the outer shell of the vehicle since these silencers usually operate at a red heat and if mounted externally would be subject to detection either visually or by some form of thermally-responsive instrument. In the present case the silencers are intended to be placed over the hubs of the engine cooling blowers, which somewhat cools the silencers but in particular cools and carries away the exhaust gases. The object of the invention is to provide a silencer adapted for these rather special purposes, having a small enough size so that it can be mounted as described but still having sufficient silencing ability to reduce the engine noise below the general rumble and clatter of a heavy tank in motion.

The invention will now be described with reference to the accompanying drawing, in which Fig. 1 is a side elevation of the silencer, partly in section on line 1—1 of Fig. 2;

Figure 1:
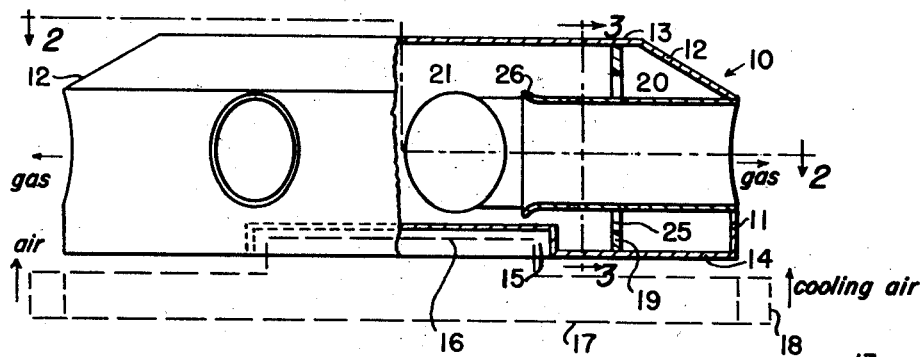
Figure 3:
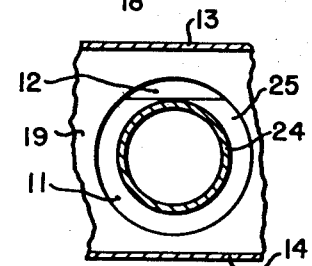
Fig. 3 is a fragmentary section taken on line 3—3 of Fig. 1.
Figure 2:
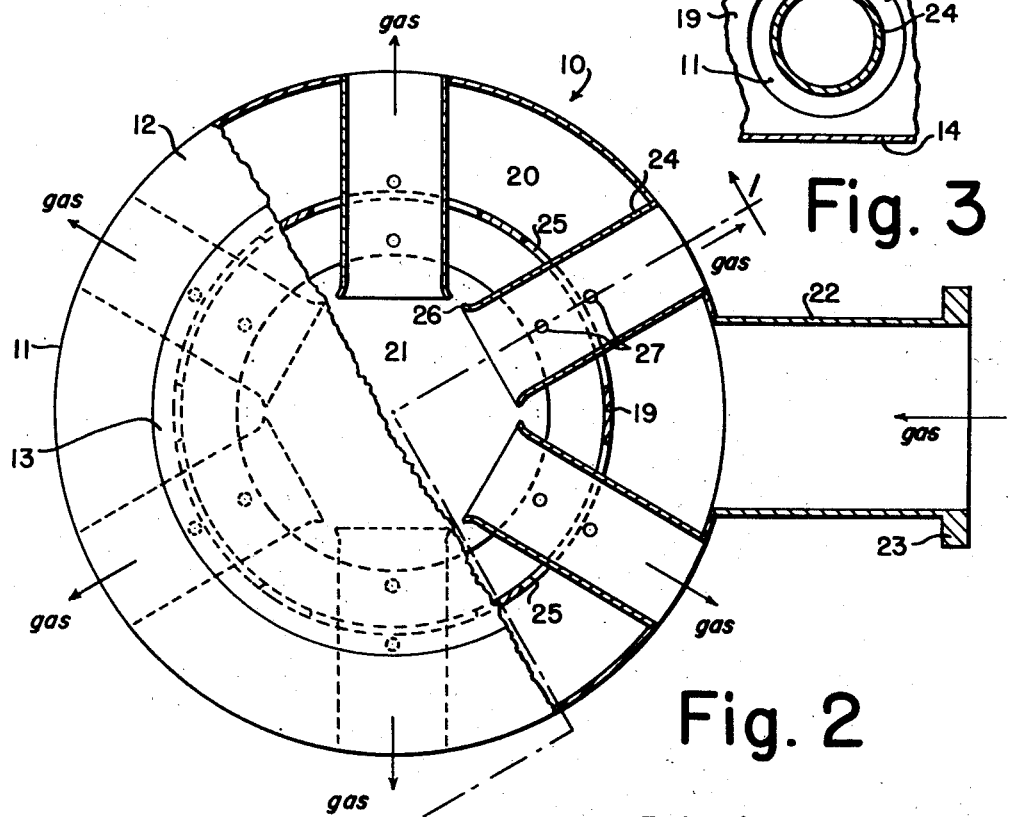
Fig. 2 is a plan view thereof, partly in section on line 2—2 of Fig. 1.

The preferred form of silencer comprises a casing 10 having a cylindrical wall 11, a short conical wall 12 which could be replaced by an extension of the cylindrical wall if space permitted, a top header 13, and a bottom header 14. The latter header is formed with a central recess 15 which, in the particular application for which this silencer was designed, affords room for a projecting portion 16 of the housing 17 of the cooling fan 18.

A cylindrical partition 19 divides the casing 10 into an annular outer chamber 20 and a cylindrical inner chamber 21. A side inlet conduit 22 enters the outer chamber 20 through a hole in the cylindrical wall 11, and is secured to the latter as by welding. The inner end of the conduit preferably terminates substantially flush with the wall 11, while its outer end is flanged as at 23 for connection to an exhaust manifold of the engine. A plurality of exhaust pipes 24 are arranged radially within the casing, passing through holes in the cylindrical wall 11 and being secured thereto as by welding substantially flush with its outer surface. They pass through holes 25 in the cylindrical partition 19 and open into the inner chamber 21, preferably with their ends flared at 26 to reduce back pressure. Holes 27 spaced at the half and quarter point prevent shock excitation of the exhaust pipes as described in Patent 2,297,046, September 29, 1942. The holes 25 are sufficiently larger than the exhaust pipes to provide passages from the outer chamber 20 to the inner chamber 21.

In operation gas from the exhaust manifold of the engine passes through the conduit 22 into the outer chamber 20. Some of the gas may pass into the inner chamber directly through the holes 25 adjacent the inlet conduit, the rest passing varying distances around the annular chamber 20 and into the inner chamber through the other holes 25. This multiplicity of available paths aids in the silencing action, as does the further multiplicity of paths out of the inner chamber through the several outlet conduits 24. The gas emerging from the outlet conduits is met by the blast from the engine cooling fan and is carried away by it as well as reduced in temperature. The same blast also cools the casing 10 somewhat, although the latter will generally operate at a red heat.

What I claim is:

1. A silencer comprising a generally cylindrical casing closed at its ends, a cylindrical partition within the casing and coaxial therewith dividing it into an annular outer chamber and a substantially cylindrical inner chamber, an inlet conduit opening into the annular outer chamber, and a plurality of outlet conduits opening through the cylindrical wall of the casing, passing through the partition in a direction at right angles to the common axis of the casing and partition, and having open ends within the inner chamber, the partition having a plurality of apertures communicating between the inner and outer chambers.

2. A silencer comprising a generally cylindrical casing closed at its ends, a cylindrical partition within the casing and coaxial therewith, dividing it into an annular outer chamber and a substantially cylindrical inner chamber, an inlet conduit opening into the annular outer chamber, and a plurality of radial outlet conduits opening through the cylindrical wall of the casing, passing through the partition in a direction at right angles to the common axis of the casing and partition, and having open ends within the inner chamber, the partition having a plurality of apertures each surrounding one of the outlet conduits and forming annular passages communicating between the inner and outer chambers.

ROLAND B. BOURNE.

References Cited in the file of this patent

UNITED STATES PATENTS

| Number | Name | Date |
|--------|------|------|
| 674,210 | Loomis | May 14, 1901 |
| 2,455,965 | Wohlberg | Dec. 14, 1948 |
| 2,513,229 | Bourne et al. | June 27, 1950 |

FOREIGN PATENTS

| Number | Country | Date |
|--------|---------|------|
| 27,715 | Norway | Mar. 5, 1917 |